United States Patent
Zeng et al.

(10) Patent No.: US 7,312,575 B2
(45) Date of Patent: Dec. 25, 2007

(54) PLASMA DISPLAY PANEL

(75) Inventors: Xiaoqing Zeng, Suwon-si (KR);
Hidekazu Hatanaka, Seongnam-si (KR); Young-mo Kim, Suwon-si (KR);
Seung-hyun Son, Hwaseong-si (KR);
Sang-hun Jang, Yongin-si (KR);
Seong-eui Lee, Seongnam-si (KR);
Gi-young Kim, Yongin-si (KR);
Hyoung-bin Park, Seongnam-si (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 11/138,320

(22) Filed: May 27, 2005

(65) Prior Publication Data

US 2005/0264202 A1    Dec. 1, 2005

(30) Foreign Application Priority Data

May 28, 2004 (KR) ............. 10-2004-0038203

(51) Int. Cl.
*H01J 17/49* (2006.01)
(52) U.S. Cl. .............. 313/582; 313/584; 313/587
(58) Field of Classification Search ........ 313/582–587; 252/301.4 R
See application file for complete search history.

(56) References Cited

U.S. PATENT DOCUMENTS 4,100,454 A * 7/1978 Hase et al. ............... 313/495
6,008,582 A * 12/1999 Asano et al. ............. 313/582
6,400,082 B1 * 6/2002 Chikazawa .............. 313/584
6,781,308 B2 * 8/2004 Hayashi ................... 313/582

FOREIGN PATENT DOCUMENTS

| CN | 1496575 | 5/2004 |
|----|---------|--------|
| EP | 1361593 A1 * | 12/2003 |
| KR | 2002-0027944 | 5/2002 |

* cited by examiner

*Primary Examiner*—Vip Patel
(74) *Attorney, Agent, or Firm*—H.C. Park & Associates, PLC

(57) ABSTRACT

A plasma display panel including a transparent front substrate, a rear substrate disposed parallel to the front substrate, a barrier wall disposed between the front substrate and the rear substrate and defining light-emitting cells, address electrodes on the rear substrate and covered by a first dielectric layer, sustain electrode pairs extending in a direction orthogonal to a direction in which the address electrodes extend and covered by a second dielectric layer, red, green and blue phosphor layers coated on sides of the barrier wall and a surface of the first dielectric layer, and red, green and blue phosphor films formed on the second dielectric layer at regions corresponding to regions where the red, green and blue phosphor layers are formed.

19 Claims, 6 Drawing Sheets

PLASMA DISPLAY PANEL

CROSS REFERENCE TO RELATED APPLICATION

This application claims priority to and the benefit of Korean Patent Application No. 10-2004-0038203, filed on May 28, 2004, which is hereby incorporated by reference for all purposes as if fully set forth herein.

BACKGROUND OF THE INVENTION

1. Field of the Invention

The present invention relates to a plasma display panel. More particularly, the present invention relates to a plasma display panel having improved luminous efficiency and picture display quality.

2. Discussion of the Background

Generally, a plasma display panel (PDP) displays desired numbers, characters or graphic data using phosphors excited by plasma-generated ultraviolet (UV) rays.

FIG. 1 shows a conventional PDP, in which a front panel and a back panel are joined together.

Referring to FIG. 1, the front panel includes a front substrate 111, sustain electrode pairs 114 comprising Y electrodes 112 and X electrodes 113 formed on the front substrate 111, a front dielectric layer 115 covering the sustain electrode pairs 114, and a protective layer 116 covering the front dielectric layer 115. The Y electrodes 112 and the X electrodes 113 include transparent electrodes 112b, 113b, which are often formed of indium tin oxide (ITO), and metallic bus electrodes 112a, 113a, respectively.

The back panel includes a rear substrate 121, address electrodes 122 formed orthogonally to the sustain electrode pairs 114, a rear dielectric layer 123 covering the address electrodes 122, barrier walls 124 formed on the rear dielectric layer 123 to define light-emitting cells 126, and red, green and blue phosphor layers 125a, 125b and 125c arranged in respective light-emitting cells 126.

Discharge gas is enclosed in the discharge space partitioned by the barrier walls 124. While half of the vacuum ultraviolet (VUV) rays may excite phosphors of the rear substrate 121 in a discharge cell during a discharge period, the remaining VUV rays may not excite phosphors.

To overcome this problem, Korean Published Application No. 2002-0027944 discloses a PDP having a phosphor layer on a front dielectric layer. In this patent, a phosphor layer is applied between dielectric layer and protective layer in the front panel. A brightness enhancement was obtained, but the low transparency and uniformity of the phosphor layer may be a problem.

SUMMARY OF THE INVENTION

The present invention provides a PDP having improved luminous efficiency, contrast ratio, color purity and color gamut.

Additional features of the invention will be set forth in the description which follows, and in part will be apparent from the description, or may be learned by practice of the invention.

The present invention discloses a plasma display panel comprising a first substrate, a second substrate substantially parallel to the first substrate, and a barrier wall between the first substrate and the second substrate and defining light-emitting cells. Address electrodes are formed on the second substrate and are covered by a first dielectric layer, and sustain electrode pairs are formed on the first substrate extending in a direction orthogonal to a direction in which the address electrodes extend, and are covered by a second dielectric layer. Red, green and blue phosphor layers are on sides of the barrier wall and a surface of the first dielectric layer, and red, green and blue phosphor films are formed on the second dielectric layer at regions corresponding to where the red, green and blue phosphor layers are formed.

The present invention also discloses a plasma display panel comprising a first substrate, a second substrate substantially parallel to the first substrate, and a barrier wall disposed between the first substrate and the second substrate and defining light-emitting cells. Address electrodes are formed on the second substrate and are covered by a first dielectric layer, and sustain electrode pairs are formed on the first substrate extending in a direction orthogonal to a direction in which the address electrodes extend and are covered by a second dielectric layer. Red, green and blue phosphor layers are coated on sides of the barrier wall and a surface of the first dielectric layer, and a blue phosphor film is formed on the second dielectric layer at a region corresponding to a region where the blue phosphor layer is formed.

The present invention also discloses a light emitting cell of a plasma display panel, and the light emitting cell is defined by a barrier wall, a first substrate and a second substrate. The light emitting cell comprises a phosphor layer on the first substrate and a side of the barrier wall, and a phosphor film on the second substrate at a location corresponding to the phosphor layer. The phosphor layer and the phosphor film emit the same color light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1:
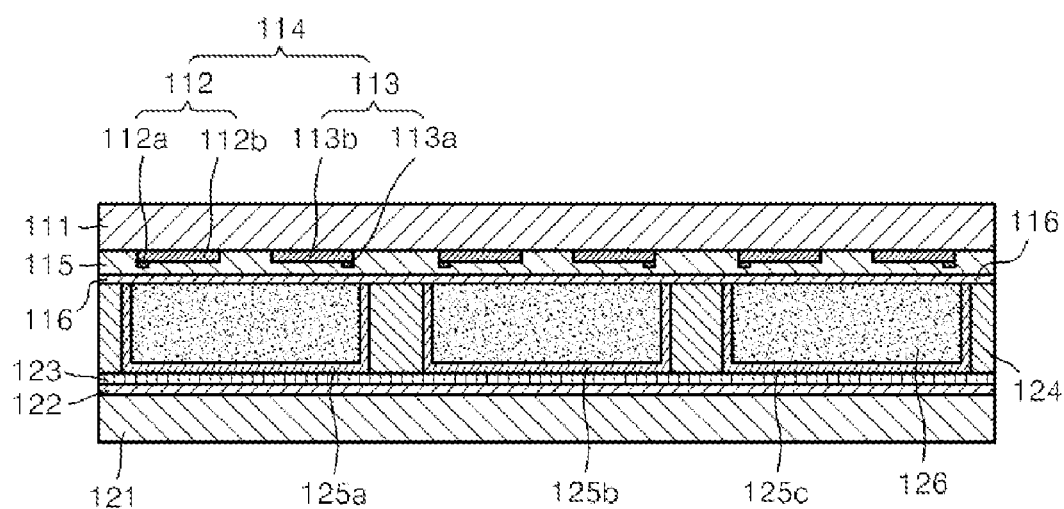
FIG. 1 is a cross-sectional view showing a conventional PDP.

In the drawings, the thickness of layers, films, panels, regions, etc. are not drawn to scale. Rather, they are exaggerated for clarity. It will be understood that when an element such as, for example, a layer, film, region or substrate is referred to as being "on" another element, such element may be directly on the other element or intervening elements may also be present. In contrast, if an element is referred to as being "directly on" another element, no intervening elements are present.

Figure 2:
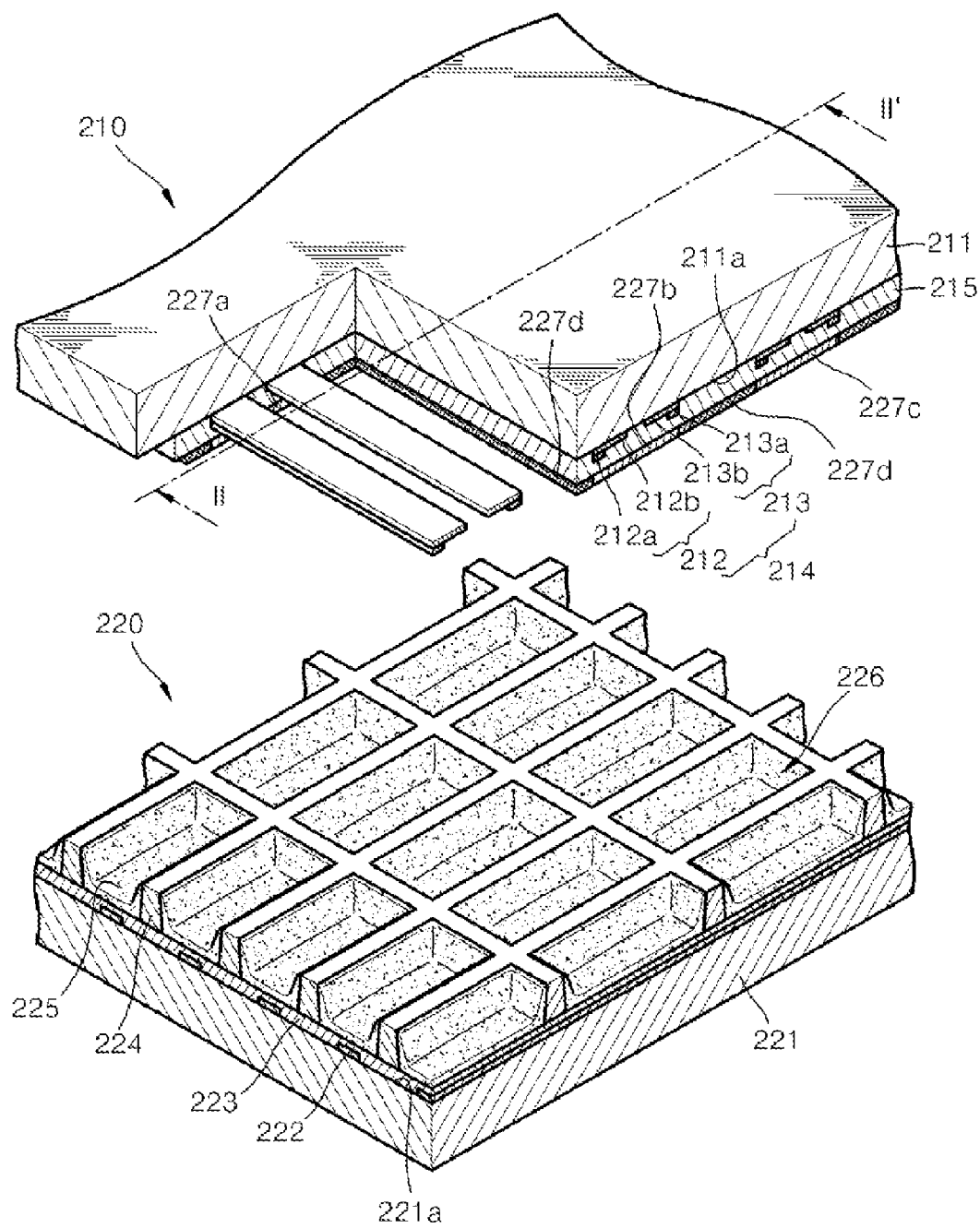
FIG. 2 is a partially exploded plan view showing a PDP according to an exemplary embodiment of the present invention.

A PDP according to an exemplary embodiment of the present invention will now be described. FIG. 2 is a partially exploded plan view showing a PDP according to an exemplary embodiment of the present invention, and FIG. 3 is a cross-sectional view taken along line II-II' of FIG. 2.

Figure 3:
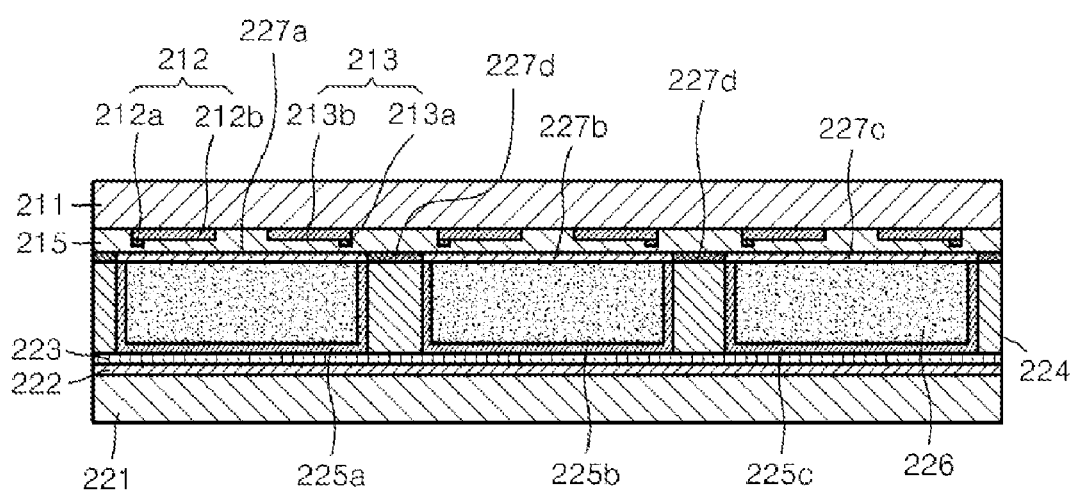
FIG. 3 is a cross-sectional view taken along line II-II' of FIG. 2.

Referring to FIG. 2 and FIG. 3, the PDP includes a front panel 210 and a rear panel 220. The front panel 210 may include a front substrate 211, sustain electrode pairs 214 arranged on an inner surface 211a of the front substrate 211 and extending over a row of light-emitting cells 226, and a front dielectric layer 215 covering the sustain electrode pairs 214.

The rear panel 220 may include a rear substrate 221 parallel to the front substrate 211, address electrodes 222 on an inner surface 221a of the rear substrate 221 and extending orthogonally to the sustain electrode pairs 214, a rear dielectric layer 223 covering the address electrodes 222, a barrier wall 224 formed between the front substrate 211 and the rear substrate 221 and defining light-emitting cells 226, and a red phosphor layer 225a, a green phosphor layer 225b and a blue phosphor layer 225c provided in the light emitting cells 226 and formed of red, blue and green phosphors, respectively, for receiving UV rays emitted from discharge gas and emitting visible light.

The red phosphor may include, for example, $(Y,Gd)BO_3$:Eu, and $Y(V,P)O_4$:Eu. The green phosphor may include, for example, $Zn_2SiO_4$:Mn, and $YBO_3$:Tb. The blue phosphor may include, for example, $BaMgAl_{10}O_{17}$:Eu.

Figure 4A:
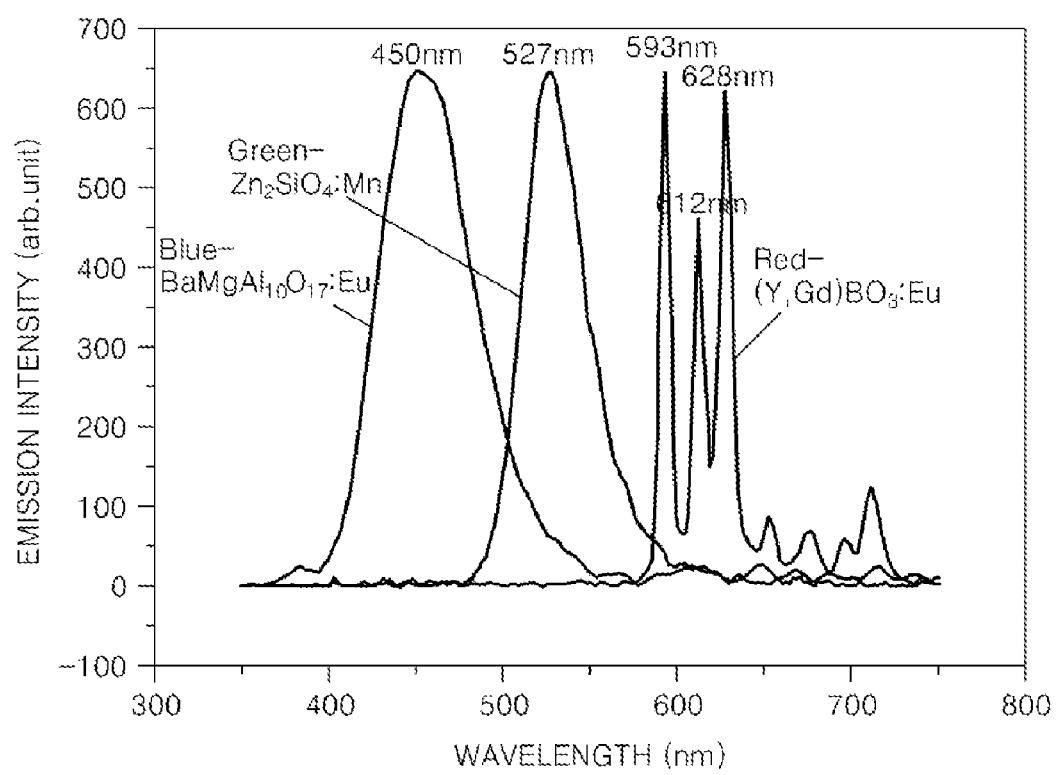
FIG. 4A is a graphical representation of emission intensity of phosphors forming a phosphor layer of the PDP according to the present invention.

FIG. 4A is a graphical representation of emission intensity of such typical phosphors. Referring to FIG. 4A, which shows the emission spectra of red, green and blue phosphor layers with 172 nm excitation, the wavelength with maximum luminescent intensity ($\lambda$max) of the blue phosphor is approximately 450 nm, and the $\lambda$max of the green phosphor is approximately 527 nm. The red phosphor showed peaks at 593 nm, 612 nm and 628 nm.

Referring back to FIG. 3, a red phosphor film 227a, a green phosphor film 227b and a blue phosphor film 227c, each having the corresponding color, may be formed on the front dielectric layer 215 at regions corresponding to regions where the red phosphor layer 225a, the green phosphor layer 225b and the blue phosphor layer 225c are formed. The red phosphor film 227a, the green phosphor film 227b and the blue phosphor film 227c may be about 300 nm to 500 nm thick and have a transmittance of approximately 80% to 85%, which is similar to that of magnesium oxide (MgO). If the red phosphor film 227a, the green phosphor film 227b and the blue phosphor film 227c are thicker than about 500 nm or thinner than about 300 nm, the luminous efficiency, contrast ratio, color purity and color gamut may be negatively affected.

As FIG. 2 and FIG. 3 show, an external light absorption layer 227d may be provided between the red phosphor film 227a and the green phosphor film 227b, between the green phosphor film 227b and the blue phosphor film 227c, and/or between the red phosphor film 227a and the blue phosphor film 227c, but the structure thereof is not limited thereto. The external light absorption layer 227d may be made of, for example, chromium oxide ($Cr_2O_3$).

The blue phosphor film 227c may comprise a zinc gallium oxide ($ZnGa_2O_4$). The green phosphor film 227b may comprise a zinc gallium oxide doped with $Mn^{2+}$ ($ZnGa_2O_4$:$Mn^{2+}$). The red phosphor film 227a may comprise a zinc gallium oxide doped with $Cr^{3+}$ ($ZnGa_2O_4$:$Cr^{3+}$).

Figure 4B:
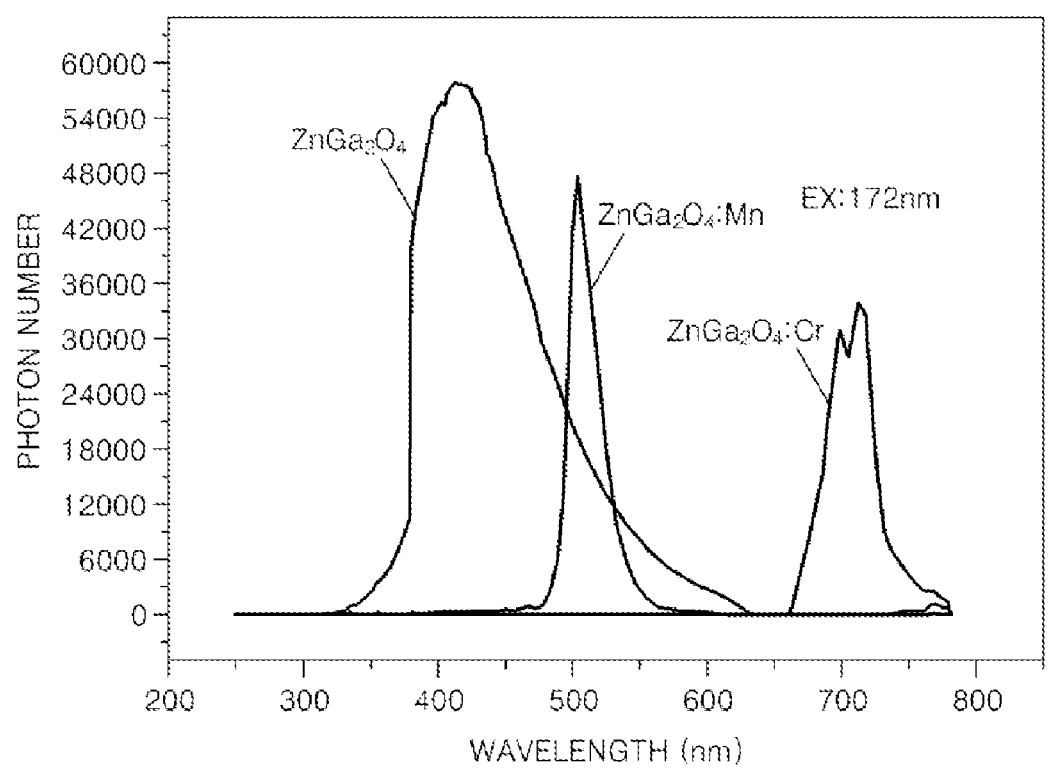
FIG. 4B is a graphical representation of the wavelength dependent photon number in materials of a phosphor film of the PDP according to the present invention.

Materials forming the red phosphor film 227a, the green phosphor film 227b and the blue phosphor film 227c may be very stable and exhibit strong emission characteristics at VUV excitation of wavelengths of 147 nm and 172 nm. Thus, these materials may function like an MgO protective layer. FIG. 4B, which illustrates emission spectral of the red, green and blue phosphor films 227a, 227b and 227c with 172 nm excitation, shows a change in photon number depending on wavelength. Referring to FIG. 4B, the blue phosphor film 227c has a maximum photon number at approximately 420 nm, the green phosphor film 227b has a maximum photon number at approximately 505 nm, and the red phosphor film 227a has a maximum photon number at approximately 720 nm.

Any suitable method, such as, for example, radio frequency (RF) magnetron sputtering evaporation, may be used to fabricate the red phosphor film 227a, the green phosphor film 227b and the blue phosphor film 227c. RF magnetron sputtering evaporation will now be described.

$ZnGa_2O_4$, $ZnGa_2O_4$:Mn or $ZnGa_2O_4$:Cr may be used as a target, and phosphor powder may be evaporated by electron beam collision. The phosphor vapor may be deposited on a substrate to form a film, which may then be annealed at about 500° C. to 700° C. under reducing atmosphere, such as, for example, 5% $H_2$+95% $N_2$.

As described above, the RF magnetron sputtering evaporation makes it possible to dispose the phosphor film on a PDP glass substrate because the phosphor film may be annealed at a low temperature, that is, 500° C. to 700° C.

According to an exemplary embodiment of the present invention, in order to increase color temperature, a protective layer may be substituted for the red phosphor film 227a and the green phosphor film 227b. Here, the protective layer may be made of MgO, for example. As described above, forming the blue phosphor film 227c at a region corresponding to a region where the blue phosphor layer is formed, and forming the protective layer at regions corresponding to where the red phosphor film 227a and the green phosphor film 227b are formed, may increase the color temperature by forming a blue light-emitting cell having the same size as that of a red or green light-emitting cell.

The front substrate 211 and the rear substrate 221 are usually formed of glass. Here, the front substrate preferably has high light transmission efficiency.

The address electrodes 222 may be made of a highly conductive metal, such as, for example, Al. The address electrodes 222 are used for address discharge together with Y electrodes 212. The address discharge selects light-emitting cells to be lit among the light-emitting cells 226. A sustain discharge, described below, occurs in selected light-emitting cells 226.

The rear dielectric layer 223 covers the address electrodes 222 and serves to protect the address electrodes 222 from damage due to collision with charged particles during an address discharge. The rear dielectric layer 223 may be formed of a dielectric material such as, for example, PbO, $B_2O_3$, or SiO2, that is capable of preventing charged particles from damaging the address electrodes 222.

The barrier wall 224, which defines light-emitting cells 226, may be formed between the front substrate 211 and the rear substrate 221. The barrier wall 224 establishes a discharge space between the front substrate 211 and the rear substrate 221, prevents crosstalk between adjacent light-emitting cells 226, and extends a surface area of a phosphor layer 225. The barrier wall 224 may be formed of glass components including various elements such as, for example, Pb, B, Si, Al, and O. When necessary, a filler such as $ZrO_2$, $TiO_2$, or $Al_2O_3$, and a pigment such as Cr, Cu, Co, Fe, or $TiO_2$ may be further added. The barrier wall may have alternative structures. For example, it may comprise a plurality of separate, stripe-shaped walls, or it may have a structure that forms hexagonal shaped light emitting cells.

The sustain electrode pairs 214, which extend over a row of light-emitting cells 226 in a direction orthogonal to a direction in which the address electrodes 222 extend, may be formed on the front substrate 211 and in parallel with each other. The sustain electrode pairs 214 may include an X electrode 213 and a Y electrode 212. A potential difference, which exceeds a discharge firing voltage, between the X electrode 213 and the Y electrode 212 causes a sustain discharge in a selected cell.

Generally, the X electrode 213 and the Y electrode 212 may include transparent electrodes 213*b*, 212*b*, and bus electrodes 213*a*, 212*a*, respectively. In some cases, a scan electrode and a common electrode may be formed with only the bus electrodes 212*a* and 213*a*.

The transparent electrodes 213*b*, 212*b* may be formed of a conductive, transparent material, such as, for example, ITO. However, since transparent conductors such as ITO may be highly resistive, transparent sustain electrodes have a high voltage drop along their length, which may significantly increase power consumption when driving the PDP, thereby lowering a response speed of an image. To overcome this problem, bus electrodes 213*a*, 212*a*, which may be formed of a highly conductive metal, such as, for example Ag, may be arranged along an edge of the transparent electrode.

The front dielectric layer 215 covers the X and Y electrodes 213 and 212, and it may comprise, for example, PbO, $B_2O_3$, and $SiO_2$. Additionally, the front dielectric layer 215 may be transparent, it insulates the X and Y electrodes from each other, and it protects the electrodes from damage due to collisions with charged particles.

Although not shown in FIG. 2 and FIG. 3, a protective layer may be formed on the phosphor film 227*a*, 227*b*, 227*c*, or between the phosphor film 227*a*, 227*b*, 227*c* and the front dielectric layer 215. Here, the protective layer protects the front dielectric layer 215 from damage due to collision with charged particles during a sustain discharge. The protective layer may be formed of MgO, for example.

The light-emitting cells 226 are filled with discharge gas. The discharge gas may be a Ne—Xe mixed gas containing 5 to 10% of Xe, for example (% means Atomic %).

The operation of the aforementioned PDP will now be described briefly. Applying an address voltage Va between the address electrode 222 and the Y electrode 212 generates an address discharge, thereby selecting a light-emitting cell 226 to be lit. When the front dielectric layer 215 is covered by a protective layer, the address discharge accumulates wall charges on the protective layer at areas adjacent to the X electrode 213 and the Y electrode 212. In other words, the address discharge may accumulate positive ions on an area adjacent to the Y electrode 212 and electrons on an area adjacent to the X electrode 213.

After the address discharge, applying a discharge sustaining voltage Vs between the Y electrode 212 and the X electrode 213 in the selected light-emitting cell generates a sustain discharge. In this case, the positive ions accumulated on the area adjacent to the Y electrode 212 collide with the electrons accumulated on the area adjacent to the X electrode 213, thereby inducing the sustain discharge. The discharge sustaining voltage Vs may be alternately applied between the Y electrode 212 and the X electrode 213 in a discharge sustain period.

The sustain discharge increases the energy level of the discharge gas. As the increased energy level gradually decreases, the discharge gas emits UV light. The UV light increases the energy level of phosphor contained in the phosphor layers 225*a*, 225*b*, 225*c* and the phosphor films 227*a*, 227*b*, 227*c* disposed in respective light-emitting cells 226. As this increased energy level gradually decreases, the light-emitting cell 226 emits visible light to display an image.

When using a fluorescent film employing $ZnGa_2O_4$, $ZnGa_2O_4$:Mn and $ZnGa_2O_4$:Cr, the luminous efficiency may be improved by 20 to 50% as compared to a conventional PDP.

Figure 5:
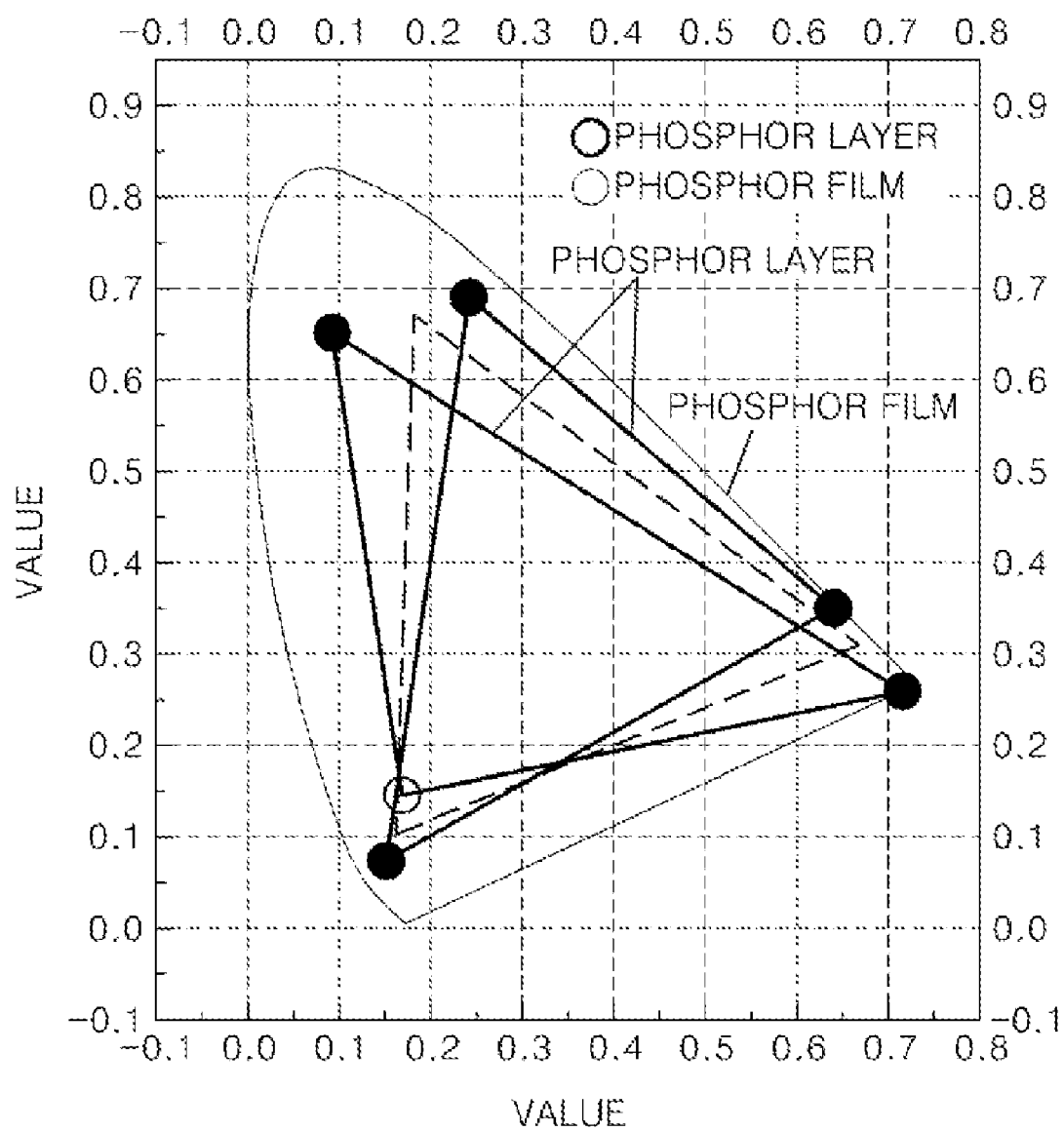
FIG. 5 is a graphical representation of color gamut when using a phosphor layer and a phosphor film according to exemplary embodiments of the present invention.

FIG. 5 is a graphical representation of color gamut in a case of using a phosphor layer and a phosphor film according to the present invention, in which the dotted lines denote a phosphor layer and a phosphor film according to the present invention.

Referring to FIG. 5, a phosphor film may have a better transmittance and contrast ratio than a phosphor layer. Further, using both the phosphor layer and the phosphor film may improve color gamut and color purity characteristics.

The PDP according to the present invention may have the following advantages and effects.

The PDP according to the present invention may have a high contrast ratio and good picture resolution and heat resistance by forming red, green and blue phosphor films at regions corresponding to regions where red, green and blue phosphor layers are formed, respectively. The phosphor film may be formed of a material having good transmittance, and enabling secondary emission together with a protective layer, e.g., MgO. Also, the color temperature of the phosphor film can be adjusted by the thickness of the protective layer, and the color temperature may be increased by substituting the protective layer for the red and green phosphor films. The PDP according to the present invention may be a DC type or AC type PDP, irrespective of discharge type.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A plasma display panel (PDP), comprising:
   a first substrate;
   a second substrate disposed substantially parallel to the first substrate;
   a barrier wall disposed between the first substrate and the second substrate and defining light-emitting cells;
   address electrodes on the second substrate and covered by a first dielectric layer;
   sustain electrode pairs on the first substrate, extending in a direction substantially orthogonal to a direction in which the address electrodes extend, and covered by a second dielectric layer, the second dielectric layer being arranged directly on the sustain electrode pairs;
   red, green and blue phosphor layers on sides of the barrier wall and a surface of the first dielectric layer; and
   red, green and blue phosphor films directly on the second dielectric layer at regions corresponding to regions where the red, green and blue phosphor layers are formed, respectively, wherein the red, green and blue phosphor films are uncovered in the light-emitting cells.

2. The PDP of claim 1,
wherein the blue phosphor film comprises $ZnGa_2O_4$.

3. The PDP of claim 1, further comprising a light absorption layer formed on the second dielectric layer and overlapping the barrier wall.

4. A plasma display panel (PDP), comprising:
a first substrate;
a second substrate disposed substantially parallel to the first substrate;
a barrier wall disposed between the first substrate and the second substrate and defining light-emitting cells;
address electrodes on the second substrate and covered by a first dielectric layer;
sustain electrode pairs on the first substrate, extending in a direction substantially orthogonal to a direction in which the address electrodes extend, and covered by a second dielectric layer;
red, green and blue phosphor layers on sides of the barrier wall and a surface of the first dielectric layer; and
red, green and blue phosphor films on the second dielectric layer at regions corresponding to regions where the red, green and blue phosphor layers are formed, respectively,
wherein the green phosphor film comprises $ZnGa_2O_4$: $Mn^{2+}$.

5. The PDP of claim 4, further comprising a light absorption layer formed on the second dielectric layer and overlapping the barrier wall.

6. The PDP of claim 4, wherein the red, green and blue phosphor films are exposed in the light-emitting cells.

7. The PDP of claim 4, further comprising a protective layer, wherein the protective layer is formed on the red, green and blue phosphor films or between the red, green and blue phosphor films and the second dielectric layer.

8. A plasma display panel (PDP), comprising:
a first substrate;
a second substrate disposed substantially parallel to the first substrate;
a barrier wall disposed between the first substrate and the second substrate and defining light-emitting cells;
address electrodes on the second substrate and covered by a first dielectric layer;
sustain electrode pairs on the first substrate, extending in a direction substantially orthogonal to a direction in which the address electrodes extend, and covered by a second dielectric layer;
red, green and blue phosphor layers on sides of the barrier wall and a surface of the first dielectric layer; and
red, green and blue phosphor films on the second dielectric layer at regions corresponding to regions where the red, green and blue phosphor layers are formed, respectively,
wherein the red phosphor film comprises $ZnGa_2O_4$:$Cr^{3+}$.

9. The PDP of claim 8, further comprising a light absorption layer formed on the second dielectric layer and overlapping the barrier wall.

10. The PDP of claim 8, wherein the red, green and blue phosphor films are exposed in the light-emitting cells.

11. The PDP of claim 8, further comprising a protective layer, wherein the protective layer is formed on the red, green and blue phosphor films or between the red, green and blue phosphor films and the second dielectric layer.

12. A plasma display panel (PDP), comprising:
a first substrate;
a second substrate disposed substantially parallel to the first substrate;
a barrier wall disposed between the first substrate and the second substrate and defining light-emitting cells;
address electrodes on the second substrate and covered by a first dielectric layer;
sustain electrode pairs on the first substrate, extending in a direction substantially orthogonal to a direction in which the address electrodes extend, and covered by a second dielectric layer;
red, green and blue phosphor layers on sides of the barrier wall and a surface of the first dielectric layer; and
a phosphor film on the second dielectric layer, the phosphor film consisting of a blue phosphor film on the second dielectric layer at a region corresponding to a region where the blue phosphor layer is formed,
wherein the blue phosphor film is uncovered in the light-emitting cells.

13. The PDP of claim 12, wherein the blue phosphor film comprises $ZnGa_2O_4$.

14. The PDP of claim 12, further comprising a protective layer formed on the second dielectric layer at regions corresponding to regions where the red and green phosphor layers are formed.

15. The PDP of claim 12, further comprising a light absorption layer formed on the second dielectric layer and overlapping the barrier wall.

16. A light emitting cell of a plasma display panel, the light emitting cell defined by a barrier wall, a first substrate and a second substrate and comprising:
a phosphor layer on the first substrate and a side of the barrier wall; and
a phosphor film on the second substrate at a location corresponding to the phosphor layer, the phosphor film being exposed in the light emitting cell,
wherein the phosphor layer and the phosphor film emit the same color light, and the phosphor film comprises $ZnGa_2O_4$:$Mn^{2+}$ or $ZnGa_2O_4$:$Cr^{3+}$.

17. The light emitting cell of claim 16, wherein the phosphor film is about 300 nm to 500 nm thick.

18. The light emitting cell of claim 16, further comprising a protective layer contacting the phosphor film.

19. A plasma display panel comprising a plurality of light emitting cells according to claim 16.

* * * * *